United States Patent
Faure

[15] 3,664,364
[45] May 23, 1972

[54] TRANSFER OF A PLURALITY OF LIQUIDS

[72] Inventor: Jean-Marie Faure, 28, Boulevard Aristide Briand, 91-Savigny S/Ogre, France

[22] Filed: Apr. 2, 1970

[21] Appl. No.: 24,995

[52] U.S. Cl.............................137/205, 137/209, 137/240, 137/253, 417/92
[51] Int. Cl........................................B67c 2/16, B67c 1/04
[58] Field of Search........................417/119, 99, 98, 97, 96; 137/14, 13, 209, 154, 205, 240, 253

[56] References Cited

UNITED STATES PATENTS

| | | | |
|---|---|---|---|
| 2,180,042 | 11/1939 | Ettinger | 417/96 X |
| 349,012 | 9/1886 | Surratt | 417/119 |
| 193,541 | 7/1877 | Nale | 417/119 |
| 947,533 | 1/1910 | Rodhe | 417/99 |
| 2,845,950 | 8/1958 | Wadsworth | 417/99 |

*Primary Examiner*—Alan Cohan
*Attorney*—Waters, Roditi, Schwartz & Nissen

[57] ABSTRACT

A chamber is provided with a plurality of conduits having non-horizontal portions into which a fluid can be continuously charged to control movement of one or more other fluids as well as a rinsing fluid which may optionally be employed.

3 Claims, 1 Drawing Figure

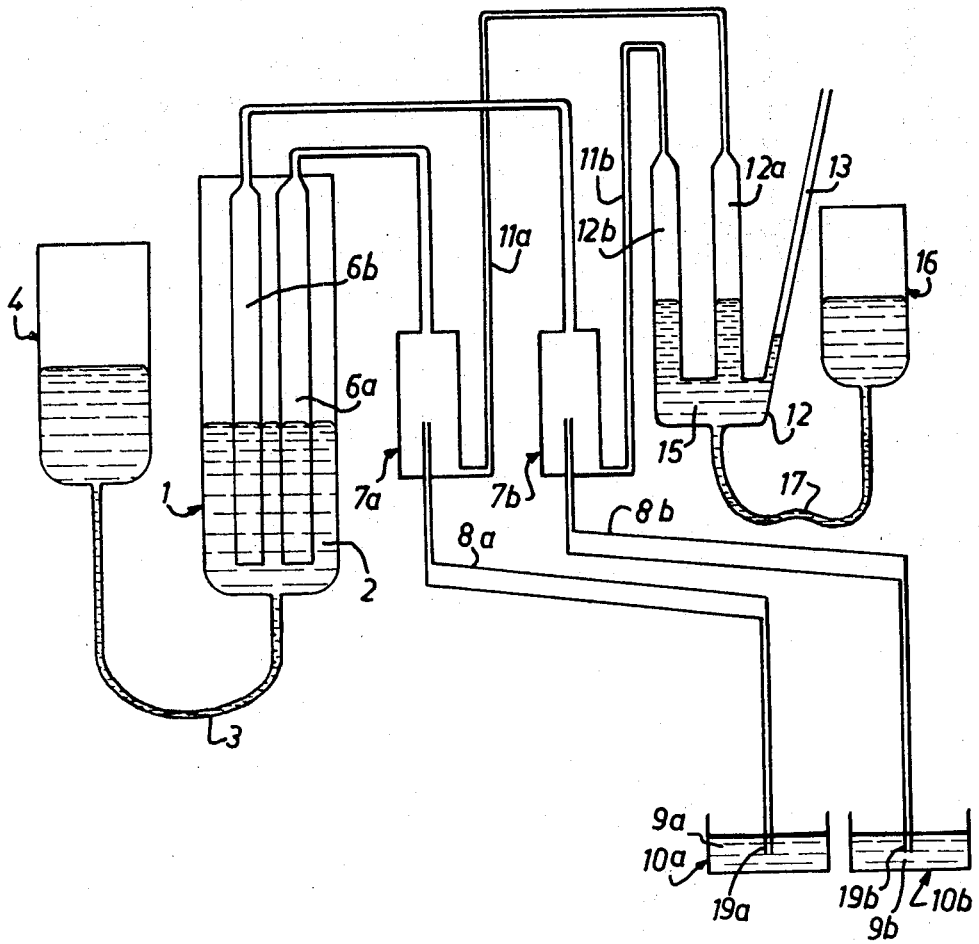

TRANSFER OF A PLURALITY OF LIQUIDS

The present invention relates to the transfer of a plurality of liquids.

In the present description and in the claims which follow, the word "transfer" will be employed to represent any operation implying the displacement of a liquid product such as, for example, the extraction into a receptacle of a quantity of liquid, the distribution from a tank of a quantity of liquid or simply the displacement of a liquid in a system of conduits, with a view, for example, to its analysis, to its mixture with other liquids or to its distribution.

In the present state of the art, it is known that the displacement of a liquid inside a chamber such as a conduit is effected by causing the volume of the said chamber to vary, either by mechanically displacing a rigid wall of the said chamber forming a piston, or by deforming a flexible wall of the chamber (the case of peristaltic pumps which deform calibrated tubes having a flexible elastic wall) or of an auxiliary chamber with which it is in communication (the case of a pipette connected to a rubber bulb or to a flexible elastically deformable flask).

In addition, if the various chambers must be rinsed after one or more transfers of liquid, it is necessary to connect an additional conduit to each of these chambers in order to bring the rinsing liquid into it. This assumes therefore that it is possible to close or open each of these conduits at will, which is also carried out, in the present state of the art, by a mechanical means acting individually on each of these conduits.

All known devices designed for the purpose of insuring the transfer of a liquid thus comprise mechanical means acting on a chamber containing the liquid or on an auxiliary chamber. This is a source of frequent malfunctions, especially due to wear or deformation of the members. In addition, if it is desired to carry out the transfer of a plurality of liquids, it is necessary to employ a plurality of chambers of variable volume, equipped with as many actuating means, unless the transfer operations of the different liquids are carried out in sequence with the same chamber. This latter type of operation is particularly not practical if these operations must be repeated a large number of times as, for example when it is desired to analyze numerous liquid products in series with the same apparatus.

The present invention has as an object the overcoming of these drawbacks by providing a method and an apparatus which enable the transfer operations of a plurality of liquids to be carried out easily and simultaneously.

According to the invention, in order to effect the simultaneous displacement of a plurality of liquids inside open chambers which respectively serve as their housing, the whole of these chambers is connected by at least one conduit to a main chamber containing an auxiliary liquid, in such manner that the said auxiliary liquid passes into a non-horizontal portion of the said conduit, and the level of the said auxiliary liquid is caused to vary in the said main conduit, so that this liquid is displaced, forming a piston inside the said conduit.

The said liquids may be in direct contact with the auxiliary liquid, in which case the auxiliary liquid should be non-miscible with the liquids to be displaced and should be compatible with them. However, it is not in any way necessary for the auxiliary liquid to be in direct contact with the liquids to be displaced, and it may be advantageous to interpose between them a suitable gas which serves as a buffer. In both cases, by acting on a single auxiliary liquid, the displacement of the liquid piston or pistons produces a suction or delivery effect in the chambers containing the liquids.

The conduit connected to the various chambers may either dip freely into the auxiliary liquid, or may be connected in a fluid-tight manner to orifices in the said chamber.

In order to effect the displacement of the auxiliary liquid, any means known per se may be employed, for example a piston, a pump, or even, as is the case in the example which will be described below to explain in a simple manner a method of carrying out the invention, a tank connected to the main chamber and capable of being displaced vertically.

A device for carrying into effect the method of the invention thus comprises a main chamber containing an auxiliary liquid, means for varying the level of the said auxiliary liquid in the said main chamber, conduits connected to the said main chamber in such manner that a non-horizontal part of each conduit may be filled with the auxiliary liquid, each of the said conduits being connected individually to a different chamber containing a liquid which it is desired to displace.

The invention is illustrated by the accompanying drawing which is given for purposes of explanation and not in any limitative sense, and in which the sole FIGURE is a view of a diagrammatic device according to the invention.

In the drawing, there is shown a receptacle 1 containing an auxiliary liquid 2, mercury for example, which is connected at its base through a flexible tube 3 to a container 4 filled with the said liquid. This container may be displaced vertically in order to vary the level of the liquid 2 in the receptacle 1.

In the liquid 2 contained in the receptacle 1 are immersed two vertical conduits 6a and 6b respectively. Each conduit is connected to an auxiliary chamber 7a or 7a respectively, into each of which pass two conduits. The extremity of one set of these conduits, 8a and 8b respectively, passes into the lower part of the auxiliary chamber and projects above the bottom of this chamber, while its other extremity 19a or 19b, respectively, is immersed in a liquid 9a or 9b respectively, of which it is desired to take a definite quantity and which is contained in a receptacle 10a or 10b respectively.

To each of the chambers 7a and 7b is also connected a conduit 11a or 11b, respectively, which opens into the corresponding chamber at a level lower than that of the extremity of the associated conduit 8a or 8b.

The conduits 11a and 11b are intended to make it possible to effect, when so desired, a simultaneous rinsing of the chambers 7a and 7b by means of an appropriate liquid. To this end, they are connected to vertical conduits 12a and 12b connected in turn to a single auxiliary chamber 12 into which opens a conduit 13 connected to a source of a rinsing liquid such as water. The chamber 12 is filled with a second auxiliary liquid 15, similar or not to the liquid 2, mercury for example. The liquid 15 is obtained from a container 16 connected to the base of the chamber 12 by a flexible conduit 17.

The operation of the device is as follows: with the levels of the liquids 2 and 15 occupying the relative positions shown in the drawing, it is only necessary to lower the container 4 in order to lower the level of the liquid 2 in the receptacle 1 to produce a simultaneous suction effect in the chamber 7a and 7b and in the conduits 8a and 8b which are thus filled with liquid 9a and 9b, respectively, the overflow delivering into the chambers 7a and 7b, After stopping the movement of the liquid 2, the tubes 8a and 8b can be extracted from the liquids 9a and 9b without any risk of emptying, on condition of course that the sections of their openings 19a and 19b respectively are not too large.

It is then only necessary to raise the container 4 in order to cause the liquid 2 to rise in the receptacle 1 and the expel the liquids contained in the tubes 8a and 8b which empty themselves simultaneously, the quantity of liquid delivered by each tube being equal to the internal volume of the tube.

During these operations, there is only a very small displacement of the liquid 15, in the present case mercury, in the conduits 12a and 12b, which does not interfere in any way with the suction of the liquids 9a and 9b. The same practical result is obtained as if each conduit 12a and 12b were individually closed by mechanical means.

In order to carry out a rinsing, the level of the liquid 15 in the conduits 12a and 12b and in the chamber 12 is lowered by lowering the container 16. When the level of the liquid 15 has fallen below the level at which the conduits 12a, 12b and 13 open into the chamber 12, the rinsing liquid passes into the conduits 12a and 12b and proceeds to rinse the chambers 7a and 7b and the conduits 8a and 8b.

As has already been indicated, the containers 4 and 16 can be replaced by other known means of varying the level of the liquids 2 and 15 respectively in the receptacles 1 and 12. Also, as has been mentioned above, the tubes 6a and 6b could equally well be connected in a fluid-tight manner to the receptacle 1, as the conduits 12a and 12b are connected to the chamber 12. Finally, it is clear that although this form of construction only provides for the simultaneous extraction of two liquids, any required number of liquids may be extracted simultaneously by employing a corresponding number of conduits of the same type as the conduits 6a and 6b, and their associated members.

A suction can also be applied in the conduits 8a and 8b in order to fill them, by reducing the level of the liquid 15 in the receptacle 12 or by simultaneously lowering the levels of the liquids 2 and 15.

The method and apparatus according to the invention may be combined with advantage with an apparatus for dosing by colorimetry, for the purpose of effecting a plurality of dosings in series. To this end, it is only necessary, for example, to make the conduits 8a and 8b or the chambers 7a and 7b of transparent material and to bring each corresponding part of these tubes or these chambers successively onto the path of the light beam of the dosing apparatus.

It will readily be understood that those skilled in the art may combine such a colorimetric dosing apparatus with a device of the same kind as that which has just been described and comprising a plurality of tubes 8 or chambers 7 disposed uniformly about a vertical axis, with respect to which they are mounted pivotally, so as to obtain a unit capable of effecting dosages by colorimetry in series.

What I claim is:

1. Apparatus for effecting transfer of liquid, said apparatus comprising a main chamber containing an auxiliary liquid, means for varying the level of the auxiliary liquid in said main chamber, a first conduit including a non-horizontal portion immersed in the auxiliary liquid, an auxiliary chamber, said first conduit opening into said auxiliary chamber, a further chamber containing a liquid to be displaced and open to the atmosphere, a second conduit immersed in the liquid in said further chamber and extending into the auxiliary chamber, a third chamber containing a second auxiliary liquid, a conduit containing a supply of rinsing liquid opening into said third chamber, means for varying the level of the second auxiliary liquid in the third chamber for controlling flow of the rinsing liquid into said third chamber, and a third conduit having a non-horizontal portion immersed in the second auxiliary liquid in the third chamber and extending into the auxiliary chamber to convey rinsing liquid to said auxiliary chamber.

2. Apparatus as claimed in claim 1 comprising a plurality of said main, auxiliary and further chambers, and a corresponding plurality of said first, second and third conduits.

3. Apparatus as claimed in claim 1 wherein the third conduit extends into the auxiliary chamber at a level below the level at which the second conduit opens into the auxiliary chamber.

* * * * *